O. W. HINER, D. C. FARNHAM AND E. A. FARNHAM, Jr.
SWINE FEEDING APPARATUS.
APPLICATION FILED SEPT. 23, 1919.
1,346,026.
Patented July 6, 1920.
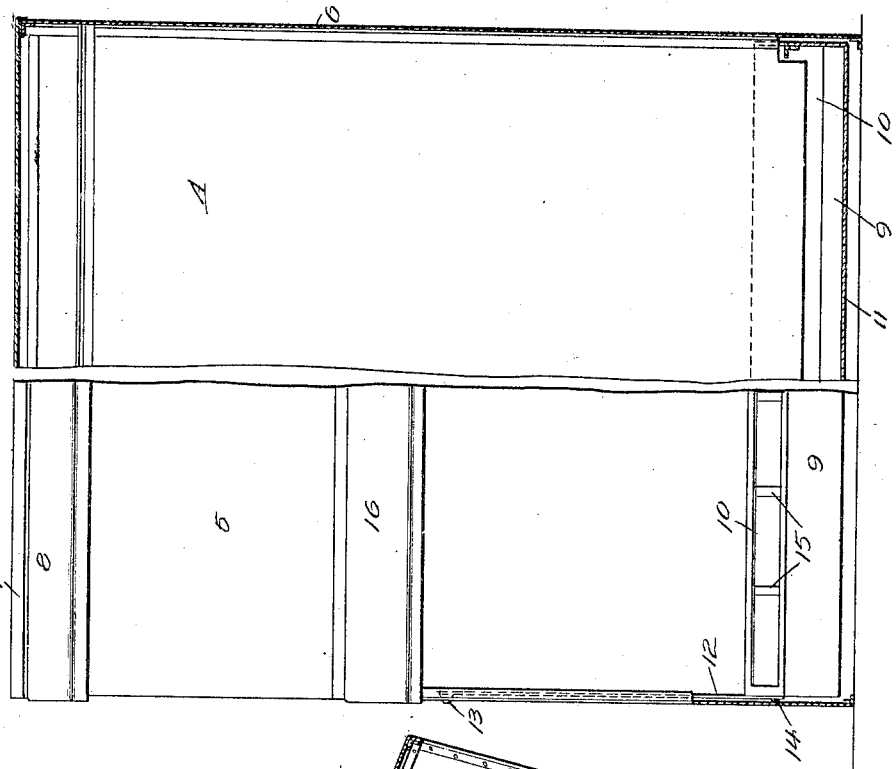
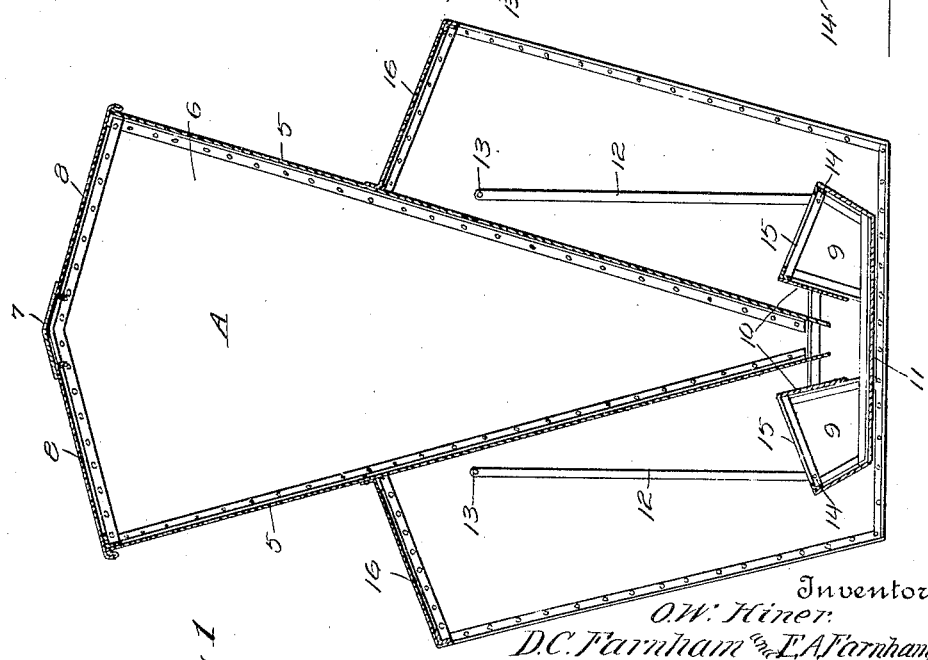
Inventor
O. W. Hiner.
D. C. Farnham & E. A. Farnham Jr.
By Geo. P. Kimmel
Attorney

UNITED STATES PATENT OFFICE.

ORA W. HINER, DANA C. FARNHAM, AND ELI A. FARNHAM, JR., OF BUTLER, INDIANA.

SWINE-FEEDING APPARATUS.

1,346,026.  Specification of Letters Patent.  Patented July 6, 1920.

Application filed September 23, 1919. Serial No. 325,758.

*To all whom it may concern:*

Be it known that we, ORA W. HINER, DANA C. FARNHAM, and ELI A. FARNHAM, Jr., citizens of the United States, residing at Butler, in the county of Dekalb and State of Indiana, have invented certain new and useful Improvements in Swine-Feeding Apparatus, of which the following is a specification.

The invention relates to an animal feeder and more particularly to the class of swine feeding apparatus.

The primary object of the invention is the provision of an apparatus of this character, wherein the feed trough for the feeding of the swine is swingingly supported relative to the feed container so that the feed from the latter will precipitate into the trough to be delivered thereto and accessible from either side of the apparatus, the trough being supported for movement so that by the nosing of the swine therein said trough will hammer the container for the positive feeding of its contents into the trough.

Another object of the invention is the provision of an apparatus of this character wherein the trough, which is swingingly supported, is housed in a novel manner so as to shed rain, sleet, or the like therefrom, yet the said trough is readily accessible from either side for the feeding of stock, thus it being seen that the feed within the trough will be protected so as to avoid the wetting thereof or the molding or otherwise decaying of the same during inclement weather.

A further object of the invention is the provision of an apparatus of this character which is comparatively simple in construction, thoroughly reliable and efficient in its operation, strong, durable, automatic in action, that is to say, the feed will be positively delivered by the nosing of the stock in the trough to deliver the feed from the container thereto, and also which is inexpensive to manufacture and install.

Other objects will be in part obvious and in part hereinafter pointed out.

The invention accordingly consists in the construction, combination and arrangement of parts as will be hereinafter fully described, illustrated in the accompanying drawings and pointed out in the claims hereunto appended.

In the accompanying drawing:

Figure 1 is a vertical transverse sectional view through a feeder constructed in accordance with the invention.

Fig. 2 is a vertical longitudinal sectional view thereof.

Similar reference characters designate like or corresponding parts throughout the several views of the drawings.

Referring to the drawing in detail, the feeder or apparatus comprises a main housing edifice or structure, including preferably a substantially hopper shaped feed container A, having downwardly convergent side walls 5, vertical end walls 6, and a roof 7, the latter including removable sections 8, interfitted with the crown of said roof and these sections when removed permit access to the interior of the feed container A.

The end walls 6 extend below the side walls 5 of the container A so that said end walls when resting upon a foundation or ground sustain the lower end of said container A, which is open at this end, elevated a slight distance above the foundation or ground. Arranged between the end wall 6 and extending crosswise of the lower open end of the container A is a movable trough 9 preferably of the shape shown although the same may be of any other desirable shape and has arranged therein on opposite sides of the container inner nose boards 10 which are disposed parallel with the outer side of said trough and likewise parallel with the side walls 5 of the container, the nose boards being slightly elevated above the bottom 11 of the trough 9 so that feed will be delivered from the lower open end of the container A onto the bottom 11 and will work laterally thereon in the direction of the outer sides of the trough 9 for access by animals, such as swine, when nosing within the trough at either side of the container.

The trough 9 at its ends is suitably cut away to accommodate between the nose boards 10 the lower open end of the container A and this trough is supported upon hanger rods 12, which are arranged in pairs at opposite ends thereof and have their upper ends engaged upon pivots 13 fixed in the end wall 6 of the container A, while the lower ends of the rods are engaged upon pivots 14 fixed in the ends of the trough 9 and in this manner the said trough is swingingly supported beneath the lower open end of the container A for free movement, the trough being normally in central position so that the nose boards 10 will be spaced from the side walls 5 of the container A and on the stock nosing in the trough the same will exert pressure against the nose boards 10 at either side of the container, thereby causing the trough to swing in a direction whereby the nose boards 10 will strike the side walls 5 adjacent thereto, thereby loosening the contents of the container for the falling of the same on the precipitation thereof into the trough 9 upon its bottom 11 supplying the trough with feed to be consumed by the stock therefrom at either side of the container.

The trough 9 on opposite sides of the container A has affixed at intervals to the outer sides of said trough and to the nose board 10 at their upper edges cross strips or guards 15 which serve to prevent the stock from climbing into the trough or lying down therein or crowding each other during the feeding period, thereby eliminating any interference during the use of the feeder. However, at no time will the feed in the container become choked or prevented from delivery into the trough as it is impossible for the stock to unduly nose the feed within the trough to interfere with the swinging movement thereof, thereby assuring positive and automatic delivery of feed from the container to the trough at all times.

The trough 9 in its swinging movement requires but little movement to effect the delivery of the feed from the container A into said trough and any interference with the animals in feeding is eliminated. There is no possibility of the animals when feeding from the trough becoming injured and at the same time such animals can consume the requisite feed for the proper growth and health thereof.

It is, of course, to be understood that the container A and trough 9 can be made from any suitable material, preferably sheet metal. Furthermore it is contemplated within the scope of the invention, to make changes, variations and modifications therein, such as come properly within the scope of the appended claims without departing from the spirit of the invention or sacrificing any of its advantages.

The end walls 6 of the container A have secured thereto to overhang the opposite sides of the trough 9 ledges 16 which shed rain, sleet, or the like from the trough to protect the same during inclement weather.

From the foregoing it is thought that the construction and manner of operation of the apparatus will be clearly understood and, therefore, a more extended explanation has been omitted.

What is claimed is:

1. In a stock feeding apparatus, a feed container having an opening in its bottom, means elevating the container over a foundation or support, a movable trough arranged beneath the open bottom of said container, adapted to receive feed therefrom for access at either side of said container and having nose boards active upon the container to dislodge feed therein for its delivery to the trough and also permit animals to seek feed from the latter between the nose boards and the outer walls of said trough.

2. In a stock feeding apparatus, a feed container having an opening in its bottom, means elevating the container over a foundation or support, a movable trough arranged beneath the open bottom of said container, adapted to receive feed therefrom for access at either side of said container and active upon the container to dislodge feed therein for its delivery to the trough, means swingingly supporting said trough relatively to the container, and nose boards arranged in the trough on opposite sides of the container and coextensive therewith to limit the swinging movement of said trough and also permit the consumption of feed by the animals from said trough during its activity upon the container.

3. In a stock feeding apparatus, a feed container having an opening in its bottom, means elevating the container over a foundation or support, a movable trough arranged beneath the open bottom of said container, adapted to receive feed therefrom for access at either side of said container and active upon the container to dislodge feed therein for its delivery to the trough, means swingingly supporting said trough relatively to the container, and nose boards arranged within the trough at opposite sides of the container and adapted to contact with the walls adjacent thereto of said container when stock is rooting for the feed within the trough.

4. In a stock feeding apparatus, a feed container having an opening in its bottom, means elevating the container over a foundation or support, a movable trough arranged beneath the open bottom of said container, adapted to receive feed therefrom for access at either side of said container and active upon the container to dislodge feed therein for its delivery to the trough, means swingingly supporting said trough relatively to the container, nose boards arranged within the trough at opposite sides of the container and adapted to contact with the walls adjacent thereto of said container when stock is rooting for the feed within the trough, and guards arranged in the trough and extending from the outer sides thereof to the nose boards.

5. In an apparatus of the character described, a body having a hopper shaped feed container open at its lower end, a trough arranged below the container and movable relative to its lower open end, nose boards arranged within the trough and adapted for hammering action upon the walls adjacent thereto of said container for dislodging feed within the latter for its delivery into the trough, and suspension means for said trough to permit free swinging movement thereof relative to the container, said nose boards being arranged to limit swinging movement of the trough and also to permit free access to said trough during its activity upon the container.

6. In an apparatus of the character described, a body having a hopper shaped feed container open at its lower end, a trough arranged below the container and movable relative to its lower open end, nose boards arranged within the trough and adapted for hammering action upon the walls adjacent thereto of said container for dislodging feed within the latter for its delivery into the trough, suspension means for said trough to permit free swinging movement thereof relative to the container, and means above the trough and projecting from opposite sides of the container to shed water from the said trough.

7. In an apparatus of the character described, a body having a hopper shaped feed container open at its lower end, a trough arranged below the container and movable relative to its lower open end, nose boards arranged within the trough and adapted for hammering action upon the walls adjacent thereto of said container for dislodging feed within the latter for its delivery into the trough, suspension means for said trough to permit free swinging movement thereof relative to the container, means above the trough and projecting from opposite sides of the container to shed water from the said trough, said nose boards being arranged spaced from the outer walls of the trough to limit swinging movement of the latter laterally with respect to the container and also permitting consumption of feed from the trough during the swinging movement thereof, and a crown roof on the container and having removable sections.

In testimony whereof, we affix our signatures hereto.

ORA W. HINER.
DANA C. FARNHAM.
ELI A. FARNHAM, Jr.